United States Patent [19]
Millard et al.

[11] 3,828,227
[45] Aug. 6, 1974

[54] SOLID TANTALUM CAPACITOR WITH END CAP TERMINALS

[75] Inventors: Richard J. Millard, Kennebunk; David R. Poat, Wells, both of Maine

[73] Assignee: Sprague Electric Company, North Adams, Mass.

[22] Filed: Apr. 9, 1973

[21] Appl. No.: 349,146

[52] U.S. Cl. ............................. 317/230, 317/234 E
[51] Int. Cl. ............................................. H01g 9/00
[58] Field of Search .................... 317/230, 234, 4, 3

[56] References Cited
UNITED STATES PATENTS

| | | |
|---|---|---|
| 2,809,332 | 10/1957 | Sherwood ........................ 317/234 E |
| 3,341,752 | 9/1967 | Fournier .............................. 317/230 |
| 3,379,577 | 4/1968 | Bird .................................. 317/234 E |
| 3,550,228 | 12/1970 | Asscher ............................ 317/234 E |
| 3,740,624 | 6/1973 | McAdams et al ................. 317/230 X |

*Primary Examiner*—Andrew J. James
*Attorney, Agent, or Firm*—Connolly and Hutz

[57] ABSTRACT

A solid tantalum electrolytic capacitor is described, having a protective TEFLON sleeve sealed at either end by two solderable metal end caps each serving as one of the capacitor terminals. This capacitor is thus suitable for flush mounting by reflow soldering to a hybrid integrated circuit substrate.

5 Claims, 2 Drawing Figures

PATENTED AUG 6 1974  3,828,227

SOLID TANTALUM CAPACITOR WITH END CAP TERMINALS

BACKGROUND OF THE INVENTION

This invention relates to solid electrolytic capacitors designed for flush mounting in hybrid integrated circuits by reflow soldering. Requirements for such components usually include small size and high volume efficiency, a disciplined geometry for each in hybrid circuits assembly, and the ability to withstand the soldering temperatures employed when mounting to the hybrid circuit substrate. Soldering conditions may be as severe as 360°C for as long as 3 minutes.

In an attempt to meet the high volume efficiency requirements, manufacturers have offered the unencapsulated solid tantalum capacitor with a solderable metal film on a portion of the body acting as the cathode terminal, and a solderable tab welded to the usual tantalum anode wire connected to the pellet, acting as the anode terminal. Such constructions have proven unsatisfactory since little or no protection is provided against humidity, corrosive and physically abusive environments.

Improvements in protection are afforded by fully molded capacitors having flat solderable leads suitable for flush mounting. The Sprague type 193 D capacitor is an example. See Sprague Engineering Bulletin 3532. However, the volume efficiency is quite low ranging from 13 to 30 percent.

Another approach has been the use of U-shaped flat metal straps fitted to either end of a tantalum capacitor body and acting as the terminals. An insulative coating is then applied over the exposed capacitor body to provide the necessary protection. Good volumetric efficiency and protection may be realized by this construction. However, the capacitor body sizes of greatest commercial interest range from about 0.00016 to 0.0007 cubic inches, and the manufacturing processes required for this package technique are difficult to control and thus are costly.

It is therefore an object of this invention to provide a solid tantalum capacitor suitable for mounting to a hybrid circuit substrate by reflow soldering, which capacitor has a low cost of manufacture.

A further object of this invention is to provide a solid tantalum capacitor having protection against moisture, corrosive materials, and physical handling.

These and other objects will become apparent in the following description of the preferred embodiments.

SUMMARY OF THE INVENTION

A solid tantalum capacitor of conventional construction, has an insulative washer adjacent to the anode end of the tantalum body. An elastomeric sleeve is snugly fitted about the body. A metal end cap connects to the cathode of the capacitor and another metal end cap connects to the anode wire. These end caps are pressure sealed over the sleeve, and they act as the terminals of the capacitor, that may be reflow solder connected to a hybrid circuit substrate.

DESCRIPTION OF THE PREFERRED EMBODIMENT

Figure 1:
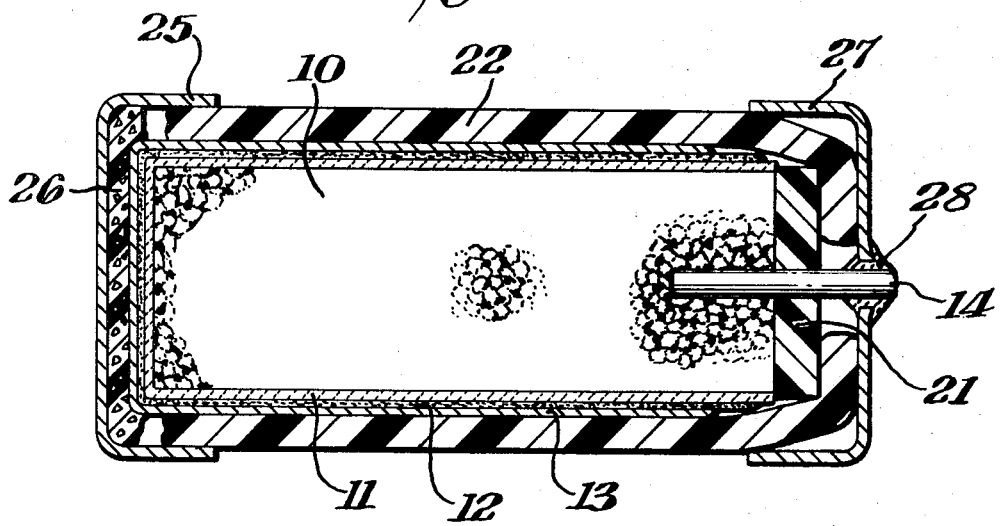
FIG. 1 shows a cross sectional view of a solid tantalum capacitor of the preferred embodiment.

In FIG. 1 is shown a cross sectional view of a solid tantalum capacitor of the preferred embodiment. The tantalum pellet 10 is a right parallelepiped having been formed by a normal process, as for example that described by Millard in U.S. Pat. No. 2,936,514 issued May 17, 1960. The pellet 10 is formed of sintered particles of tantalum wherein a thin oxide is grown over all pellet surfaces inside and out. Substantially filling the pores of the pellet and contiguous with the oxide is a coating of manganese dioxide 11. Disposed upon the surface of the conductive manganese dioxide 11, is an outer layer of carbon particles 12. A continuous copper film 13 covers one end and a portion of the four adjacent sides of the tantalum capacitor pellet. This film 13 is thus the cathode, and the left side of the pellet as shown is referred to as the cathode end.

A tantalum wire 14, around which the sintered pellet has been formed, extends from the opposite side of the pellet 10, and serves as the anode. The right side of the pellet as shown is thus referred to as the anode end.

A TEFLON washer 21 with a hole in the center lies adjacent to the anode end of the pellet and fits tightly about the base of the tantalum wire 14 that extends from the pellet. TEFLON is an E. I. DuPont de Nemours Company trade name covering a variety of high temperature fluorocarbon plastic materials.

A sleeve 22, made of an irradiated TEFLON is fitted snugly about the body of the pellet 10, by heat shrinking. The sleeve is Type TFE No. 31E made by Penntub Plastics Co., Inc. It is roughly flush with the cathode end and extends over the washer 21 at the anode end of the pellet 10.

A formed metal cap 25, made of copper is fitted over the cathode end of the assembly. A silicone resin loaded with silver particles forms a bond 26 between the cap 25 and the copper film 13, effecting an electrical and mechanical connection therebetween.

Another metal cap 27 made of nickel and having a hole through which the wire 14 passes, is fitted to the anode end of the assembly, and a weld 28 makes mechanical and electrical connection between the anode wire 14 and cap 27.

Both caps 25 and 27 are clamped tightly over the sleeve 22 forming a thermoplastic to metal pressure seal. The wire 14 is cut off flush with the weld 28.

Figure 2:
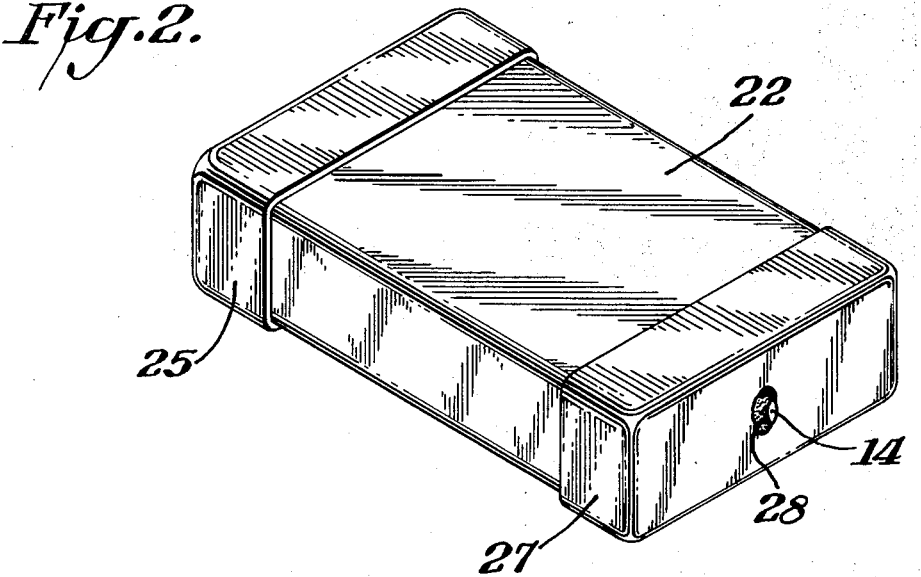
FIG. 2 shows a perspective view of the capacitor in FIG. 1.

In FIG. 2 is shown a perspective view of the finished capacitor of the preferred embodiment. Cap 25 serves as the cathode terminal and cap 27 serves as the anode terminal of the capacitor. Since both metal caps are readily solderable, the capacitor may be flush mounted to a planar hybrid integrated circuit substrate by a standard hot air reflow solder technique.

An important feature of capacitors made according to the present invention is their low cost of manufacture. The materials used in the packaging of the tantalum capacitor body are all inexpensive and readily available. The processes employed are all well known and well established manufacturing processes.

Experimental capacitors were built according to the description of the first preferred embodiment. The volume efficiency of these experimental capacitors was compared to standard Sprague 193 D types, each having the same volt-microfarad product, over a range of 26 to 470 volt-microfarads. Capacitors according to this invention were found to have about 50 percent greater volume efficiency. Electrical tests on the experimental units indicate insignificant changes due to the packaging or subsequent reflow soldering at 360°C to a substrate.

Typically the manganese dioxide coating is achieved by pyrolysis of a liquid manganous nitrate in which the oxidized pellet has been vacuum impregnated. The TEFLON washer 21 in the preferred embodiment serves to keep the liquid manganous nitrate from the anode end of the pellet 10, expecially for preventing it reaching the anode wire 14 since TEFLON doesn't wet. Thus, conductive manganese dioxide is prevented from shorting out the capacitor at the weld.

With this purpose in mind it is obvious that other techniques for making a suitable washer 21 may be used. For example a fluorocarbon powder paste, comprised of a suspension of fluorocarbon particles in a vehicle (e.g., DuPont TEFLON Primer No. 851-204) may be painted on the anode end of the pellet and heated to form a cohesive layer. Other high temperatures materials such as silicone varnishes may be similarly used. The word washer, as used herein, is meant to include such painted coatings as those just described.

The electrode film 13 is preferably copper but may also be a film of brass, bronze, or silver. These materials may be applied by spraying of the molten metal or by application of a paste made of particles of the metal suspended in an organic vehicle.

The metal cap 25 may be secured mechanically and electrically to the cathode film 13 by welding, brazing, or with a high temperature stable conductive adhesive as described for use in the preferred embodiment.

In general, a wide variety of materials may be used according to the principles of this invention for producing a solid tantalum capacitor that can withstand high temperatures and is capable of being reflow soldered to an integrated hybrid circuit substrate.

What is claimed is:

1. An electrolytic tantalum capacitor comprising:

a. a conventional solid tantalum capacitor body whose shape is a right parallelepiped, having four sides, a cathode end and an anode end;
    b. an anode lead wire attached to said body at said anode end;
    c. an insulative washer being adjacent to said anode end of said pellet with said wire protruding through said washer;
    d. a conductive coating covering only said cathode end and at least a portion of said sides of said body;
    e. an insulative tubular sleeve fitted snugly to said four sides of said body;
    f. a first solderable metal end cap being fitted over said cathode end of said body and extending over a portion of said sleeve, and sealed thereto, said first end cap being conductively connected to said conductive coating; and
    g. a second solderable metal end cap being fitted over said anode end of said body and extending over a portion of said sleeve and sealed thereto, said second end cap being electrically connected to said wire.

2. The capacitor of claim 1 wherein said sleeve is composed of a fluorocarbon elastomer, said first metal end cap is made of copper, and said second metal end cap is made of nickel.

3. The capacitor of claim 1 wherein said second end cap includes a hole through which said wire passes, and said connection is made by welding said wire therein.

4. The capacitor of claim 1 wherein said washer is composed of a fluorocarbon elastomer.

5. The capacitor of claim 1 wherein said washer consists of a layer having been applied to said anode end of said pellet in the form of a paste, comprised essentially of fluorocarbon particles and a liquid vehicle, said liquid having been heated to form a continuous-solid insulative layer.

* * * * *